Aug. 11, 1942.   K. B. NORSELL   2,292,467
MEANS FOR ANCHORING PINS INTO METALLIC MEMBERS
Filed Feb. 21, 1940
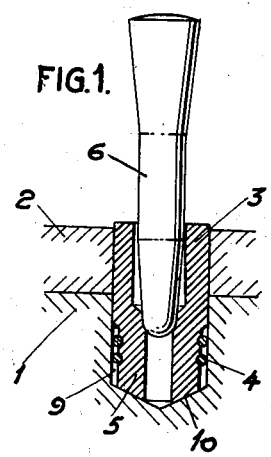
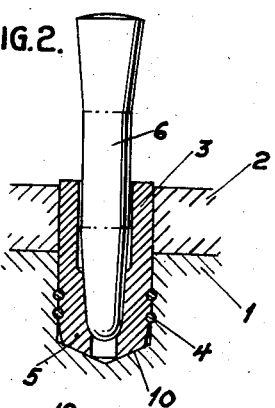
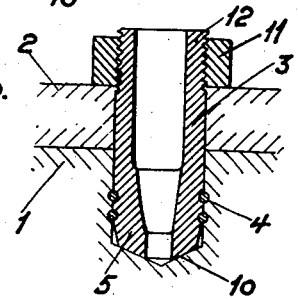
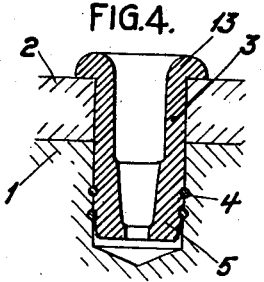
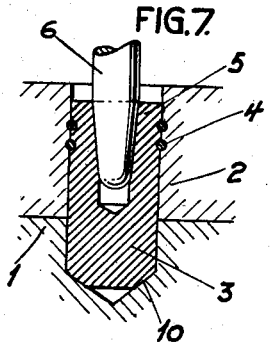
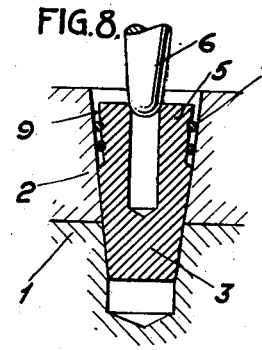
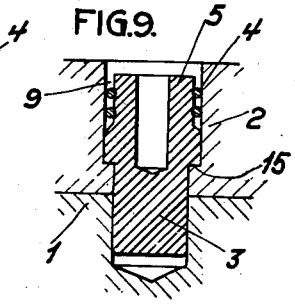
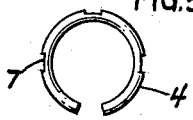
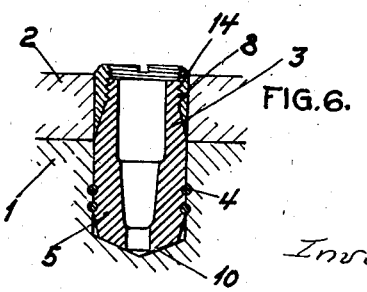
Inventor,
K. B. Norsell
By: Glascock Downing & Siebold
Attys.

Patented Aug. 11, 1942

2,292,467

UNITED STATES PATENT OFFICE 2,292,467

MEANS FOR ANCHORING PINS INTO METALLIC MEMBERS

Knut Birger Norsell, Alsten, Sweden

Application February 21, 1940, Serial No. 320,171
In Sweden October 22, 1937

4 Claims. (Cl. 85—2)

The present invention relates to means for permanently anchoring pins in holes made in a member of metallic material.

A main object of the invention is to produce an accurate and secure connection of two or more machine members with respect to a hole drilled through them in order to fix the relative position of said members, the pin being anchored in one of the members.

Particularly, the invention aims at cases where the hole ends blindly in one of the machine members to be connected, but where considerable forces must be checked acting parallel to the face of the joint, perpendicular to it or both ways.

Further, the invention is applicable particularly to machine members, where vibrationproof anchorage is of importance.

With the above and other objects in view which will hereinafter appear as the description continues, the invention consists of the novel features of construction, combinations and formation of parts as will be hereinafter more fully described and particularly pointed out in the appended claims.

In the accompanying drawing:

Fig. 1 is a sectional view of two machine members to be connected, the pin being shown in axial section and prior to its anchoring in one of the members;

Fig. 2 is a similar view showing the pin after the anchorage;

Fig. 3 is a view similar to that one shown in Fig. 2, the pin being provided with a projecting threaded portion;

Fig. 4 is a view also similar to that one shown in Fig. 2, the pin having an abutting head like a rivet;

Fig. 5 is a detail view showing a ring used for the anchorage;

Fig. 6 is a view similar to that one shown in Fig. 2, illustrating a modified arrangement;

Fig. 7 is a further view similar to that one shown in Fig. 2, but illustrating the pin anchored to the upper machine member;

Fig. 8 is a view similar to that one shown in Fig. 7, but illustrating a conical pin to be anchored to the upper machine member;

Fig. 9 is a view similar to that one shown in Fig. 8, but illustrating a cylindrical pin.

In the drawing like and corresponding parts are designated by similar reference characters throughout the several views.

Thus, in all of the figures, except Fig. 5, 1 and 2 denote two metallic members to be connected by a pin anchored in one of them. The said pin comprises a fitting section 3 made to fit exactly in a hole made in the two members and an anchoring section 5 of a reduced diameter to be anchored in one of the members. The anchorage is produced by means of ridges 4 located in the annular space 9, Figs. 1 and 9, between the anchoring section 5 and the wall of the corresponding hole.

Referring now particularly to Figs. 1 and 2, the pin is cylindrical with a reduced cylindrical anchoring section 5. In Fig. 1 the pin is shown inserted in a hole drilled through the two members 2 and 1 to be connected, the hole ending blindly in the lower member 1 to form an abutting seat 10 for the anchoring section 5, the pin being shown prior to its anchoring. The said pin is hollow, the bore in the anchoring section 5 having a reduced diameter. Placed in the annular space 9 between the anchoring section 5 and the wall of the hole in the member 1 are spaced ridges 4, for instance in the form of rings, overbridging the space and clearing the wall of the hole enough only to make a forceless insertion of the pin possible. The material of the pin and particularly of its anchoring section 5 is to be tensible, and the material of the ridges 4 is to be harder than that of the wall of the hole in the member 1.

In anchoring the pin a punch 6 is driven by hammer-blows into the reduced bore of the anchoring section 5 causing the tensible material of said section to yield radially towards the wall of the hole and to press the ridges 4 into said wall, as visible from Fig. 2, the material of the anchoring section being packed tightly against the wall, so that the tensible stress during the procedure of expansion brings about a compressional stress in the material of the anchoring section at the finished anchorage.

After removing the punch 6 the anchorage stays intact and renders a considerable resistance not only to forces acting perpendicular to to pin but also to forces acting axially thereof tending to pull out the pin.

The projecting ridges can be made integral with the anchoring section 5 or in the form of coils or rings, as shown in Fig. 5, laid directly on or in shallow rills turned in the face of the anchoring section. Small slots 7 cut on the periphery of the coils or rings, as shown in Fig. 5, materially add to the rigidity of the anchorage. This is due to the fact that the said rings, when jammed between the anchoring section and the wall of the hole during the driving procedure, do not widen evenly along the circumference but to a greater extent at the weakened portions, hence producing at the final anchorage a more or less polygon-like contour. This again presents additional resistance to forces with tendency to turn the pin about in the hole.

Used for securing machine parts together the invention is applicable for separable or permanent connection.

An example of the separable type is shown in Fig. 3, where the two members 1 and 2 are held together by a nut 11 screwed on a projecting threaded portion 12 of the fitting section 3 of the pin. The said fitting section is anchored in the member 1 in the same way as described with reference to Figs. 1 and 2.

An example of the non-separable type is shown in Fig. 4, where the pin has a head 13 on its free end, which like the head of a rivet is kept seated against the member 2 during the driving procedure, thereby securing a tight joint between the members 1 and 2 after the anchorage.

As generally two or more pins are needed for the interlocking of two members it is necessary, when a separation of the two members is required and when the pins are cylindrical, to keep the axes of the pins exactly parallel. This meets no difficulty, when the pin holes are drilled on the table of a stationary drilling machine, but cannot be anticipated in the use of a hand drilling machine as is often the case on heavy work pieces.

This can be overcome by using a construction of the kind shown in Fig. 6. Here, the pin is anchored in the member 1 in the same way as shown in Figs. 1 and 2. However, the fitting section 3 of the pin is to some extent made tapering towards its free end, the outermost part of which forms a cylindrical threaded portion 14. Screwed on this portion is a sleeve nut 8 fitting into the bore of the member 2 and having itself a tapered bore fitting to the tapered portion of the pin.

The pressure between the pin and the sleeve nut when screwed together causes a slight swelling of the latter, which assures of a proper fitting between the hole and the pin without the need of a great accuracy as to equal sizes.

By unscrewing the nut from the pin it is clearly evident that the member 2 can be lifted off the lower member 1 without jamming against the pin as long as the path of this movement does not divert more than half of the conus angle of the pin off the axis thereof.

At instances where no axial load is to be carried by the pin the anchoring section can be placed at either end of the pin. Figs. 7, 8 and 9 show some arrangements, where the anchoring section 5 faces the wall of the open-end hole in the upper member 2. In these cases it is not necessary to extend the bore of the pin considerably further than the length of the anchoring section. With respect to the way of keeping the pin seated during the procedure of driving there are three different ones illustrated, i. e. in Fig. 7 as by means of a seat 10 at the bottom of the blind hole in the member 1, as in the Figures 1, 2, 3 and 6, in Fig. 8 by means of the tapered wall of the hole, the pin being equally tapered, and in Fig. 9 by means of a shoulder 15 on the pin abutting against a corresponding shoulder in the hole in the upper member 2.

While I have illustrated and described with particularity only certain preferred forms of my invention I do not desire to be limited to the particular details of construction and arrangement illustrated, but intend to cover all forms and arrangements falling within the terms of the definitions of my invention constituting the appended claims.

What I claim as new and desire to secure by Letters Patent of the United States of America is:

1. Means for permanently anchoring a round pin in a hole made in a member of metallic material, comprising a hollow pin having a fitting section filling the corresponding section of the hole in said member and an anchoring section of tensible material and of a reduced diameter leaving an annular space between it and the wall of the hole, means for axially seating the pin, and ridges projecting radially from the face of the said anchoring section and overbridging said space and of harder material than that of the wall of the hole, said ridges comprising axially spaced rings laid around the face of the anchoring section and having circumferentially spaced weakened portions, said anchoring section being expanded radially towards the said wall and compressed causing the ridges to be pressed into the wall, thereby creating a tight and unseparable joint between the anchoring section and the said member.

2. A pin adapted to be permanently anchored in a hole in a member of metallic material, said pin comprising a fitting section adapted to fill the corresponding section of said hole and an unbroken anchoring section of tensible material and of reduced diameter leaving an annular space between it and the wall of said hole when inserted, and projections on said anchoring section of a harder material than that of the anchoring section and that of the wall of said hole and adapted to overbridge said space, said pin being hollow at least with respect to the anchoring section thereof.

3. A pin adapted to be permanently anchored in a hole in a member of metallic material, said pin comprising a fitting section adapted to fill the corresponding section of said hole and an unbroken anchoring section of tensible material and of reduced diameter leaving an annular space between it and the wall of said hole when inserted, and annular projections on said anchoring section of a harder material than that of the anchoring section and that of the wall of said hole and adapted to overbridge said space, said pin being hollow at least with respect to the anchoring section thereof.

4. A pin adapted to be permanently anchored in a hole in a member of metallic material, said pin comprising a fitting section adapted to fill the corresponding section of said hole and an anchoring section of tensible material and of reduced diameter leaving an annular space between it and the wall of said hole when inserted, and projections on said anchoring section of a harder material than that of the anchoring section and that of the wall of said hole and adapted to overbridge said space, said projections comprising axially spaced rings laid around the face of the anchoring section and having circumferentially spaced weakened portions, said pin being hollow at least with respect to the anchoring section thereof.

KNUT BIRGER NORSELL.